(12) United States Patent
Chiu et al.

(10) Patent No.: US 11,156,815 B2
(45) Date of Patent: Oct. 26, 2021

(54) COMPOUND PARABOLIC CONCENTRATOR INCLUDING PROTRUSION

(71) Applicant: Intel Corporation, Santa Clara, CA (US)

(72) Inventors: Chia-Pin Chiu, Tempe, AZ (US); Anna M. Prakash, Chandler, AZ (US); Amanuel M Abebaw, Chandler, AZ (US); Olga Gorbounova, Fremont, CA (US); Ching-Ping Janet Shen, Gilbert, AZ (US); Shan Zhong, Chandler, AZ (US); Mark Saltas, Buckeye, AZ (US)

(73) Assignee: Intel Corporation, Santa Clara, CA (US)

( * ) Notice: Subject to any disclaimer, the term of this patent is extended or adjusted under 35 U.S.C. 154(b) by 280 days.

(21) Appl. No.: 16/336,607

(22) PCT Filed: Sep. 30, 2016

(86) PCT No.: PCT/US2016/054848
§ 371 (c)(1),
(2) Date: Mar. 26, 2019

(87) PCT Pub. No.: WO2018/063348
PCT Pub. Date: Apr. 5, 2018

(65) Prior Publication Data
US 2020/0073099 A1    Mar. 5, 2020

(51) Int. Cl.
*G02B 19/00* (2006.01)
*G01J 1/04* (2006.01)

(52) U.S. Cl.
CPC ........ *G02B 19/0076* (2013.01); *G01J 1/0422* (2013.01); *G02B 19/0028* (2013.01)

(58) Field of Classification Search
CPC ....................... G02B 19/0076; G02B 19/0028; G01J 1/0422
See application file for complete search history.

(56) References Cited

U.S. PATENT DOCUMENTS

| 2003/0141455 A1 | 7/2003 | Lambert et al. |
| 2006/0231133 A1 | 10/2006 | Fork et al. |

(Continued)

FOREIGN PATENT DOCUMENTS

| WO | WO-2006102846 A1 | 10/2006 |
| WO | WO-2018063348 A1 | 4/2018 |

OTHER PUBLICATIONS

"International Application Serial No. PCT/US2016/054848, International Search Report dated Jun. 16, 2017", 3 pgs.

(Continued)

*Primary Examiner* — Georgia Y Epps
*Assistant Examiner* — Don J Williams
(74) *Attorney, Agent, or Firm* — Schwegman Lundberg & Woessner (57) ABSTRACT

Various embodiments disclosed relate to an assembly. The assembly includes a compound parabolic concentrator including an exit aperture that has a generally circular perimeter, which defines a circumference of the exit aperture. The assembly further includes a photodiode sensor generally that is aligned with the exit aperture of the compound parabolic concentrator. An optical adhesive layer adheres the exit aperture of the compound parabolic concentrator to the photodiode sensor. A protrusion extends between at least a portion of the perimeter of the compound parabolic concentrator exit aperture and the photodiode.

18 Claims, 4 Drawing Sheets

(56) References Cited

U.S. PATENT DOCUMENTS

2007/0158538 A1 7/2007 Wang
2010/0132793 A1 6/2010 Nakamua et al.
2014/0145069 A1* 5/2014 Earman ............. H01L 31/02327
250/214 SW

OTHER PUBLICATIONS

"International Application Serial No. PCT/US2016/054848, Written Opinion dated Jun. 16, 2017", 12 pgs.

* cited by examiner

COMPOUND PARABOLIC CONCENTRATOR INCLUDING PROTRUSION

CROSS-REFERENCE TO RELATED APPLICATION

This application is a U.S. National Stage Filing under 35 U.S.C. 371 from International Application No. PCT/US2016/054848, filed on Sep. 30, 2016, and published as WO 2018/063348 on Apr. 5, 2018, which application is incorporated herein by reference in its entirety.

BACKGROUND

The efficiency and performance of an optical instrument is strongly tied to the coupling efficiency and percentage of photons received by the instrument that are actually used. For example some instruments include a light collector associated with a light sensor that converts light energy into an electrical current. The performance of the sensor, and the instrument as a whole, is decreased if the light collector passes less than 100% of the light collected to the sensor. It is desirable therefore to improve the design of optical instruments to increase the percentage of the collected light that is passed to the sensor.

BRIEF DESCRIPTION OF THE FIGURES

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

DETAILED DESCRIPTION OF THE INVENTION

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section.

In the methods described herein, the acts can be carried out in any order without departing from the principles of the invention, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range, and includes the exact stated value or range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%.

The term "radiation" as used herein refers to energetic particles travelling through a medium or space. Examples of radiation are visible light, infrared light, microwaves, radio waves, very low frequency waves, extremely low frequency waves, thermal radiation (heat), and black-body radiation.

The term "light" as used herein refers to electromagnetic radiation in and near wavelengths visible by the human eye, and includes ultra-violet (UV) light and infrared light, from about 10 nm to about 300,000 nm wavelength.

The term "UV light" as used herein refers to ultraviolet light, which is electromagnetic radiation with a wavelength of about 10 nm to about 400 nm.

The term "infrared light" as used herein refers to electromagnetic radiation with a wavelength between about 0.7 micrometers and about 300 micrometers.

The term "cure" as used herein refers to exposing to radiation in any form, heating, or allowing to undergo a physical or chemical reaction that results in hardening or an increase in viscosity.

Figure 1:
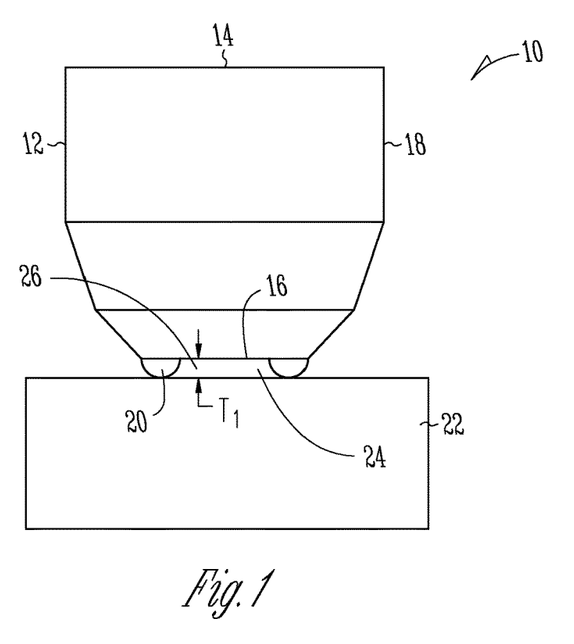
FIG. 1 is a schematic view of an assembly that may be disposed in a camera, in accordance with various embodiments.
Figure 2:
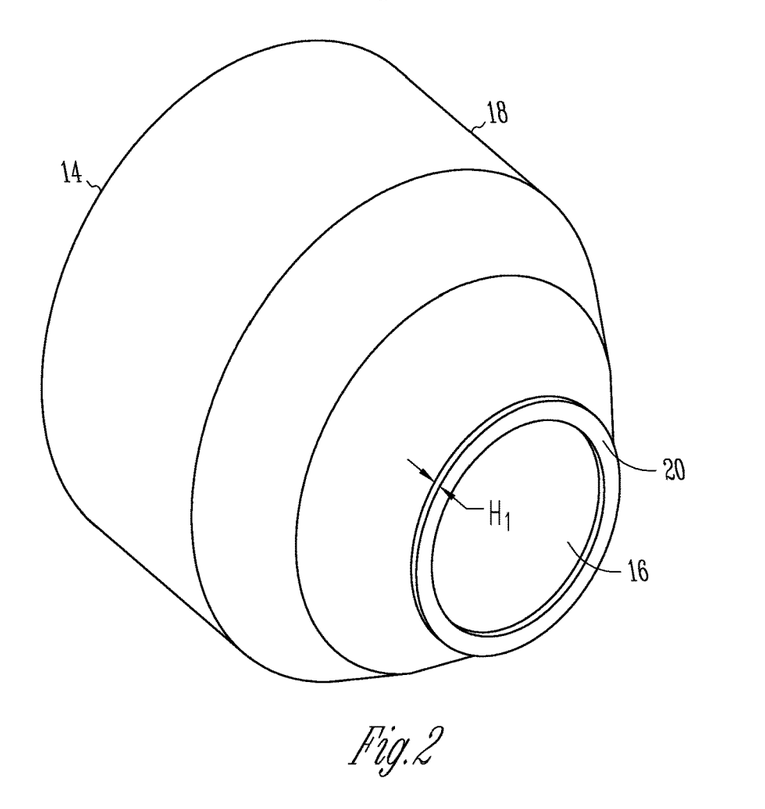
FIG. 2 is a perspective view of a compound parabolic concentrator of the assembly of FIG. 1 in accordance with various embodiments.

FIGS. 1 and 2 show many of the same components and are discussed concurrently. FIG. 1 is a schematic view of an assembly that may be disposed in a camera. FIG. 2 is a perspective view of a compound parabolic concentrator of assembly 10. Assembly 10 is used to capture light and convert the light into an electrical signal. Assembly 10 includes compound parabolic concentrator 12. Compound parabolic light concentrator 12 includes light entrance aperture 14, which has a generally circular profile having a first circumference. Compound parabolic light concentrator 12 further includes light exit aperture 16, which has a generally circular profile having a second circumference smaller than the first circumference, which defines a perimeter of exit aperture 16. Sidewall 18 connects light entrance aperture 14 and light exit aperture 16. Protrusion 20 extends axially from at least a portion of the perimeter of light exit aperture 16 and abuts photodiode sensor 22. The portion of the perimeter can be any distance along perimeter and can have an arced shape or any other suitable shape. Protrusion 20 is integral to compound parabolic light concentrator 12. Photodiode sensor 22 is generally aligned with exit aperture 16 to receive radiation from concentrator 12. Optical adhesive layer 24 adheres exit aperture 16 to the photodiode sensor 22. Optical adhesive layer 24 is located within and is substantially encased by cavity 26, which is defined between exit aperture 16, photodiode sensor 22, and protrusion 20.

Compound parabolic light concentrator 12 is molded from a plastic material or other materials such as glass. Protrusion 20 is formed from the same material as that of compound parabolic light concentrator. Optical adhesive layer 24 includes an epoxy resin. Photodiode sensor 22 is typically made of silicon, germanium, or indium gallium arsenide. The specific material (e.g., plastic or epoxy resin) that each component is selected from, is driven by the refractive index of each material. For reasons described herein, the refractive index of each material in assembly 10 should be substantially equivalent. Typically the refractive index of each material is selected from a value ranging from about 1.3 to about 1.8.

In operation for example, light, typically infrared radiation, contacts entrance aperture 14 of compound parabolic light concentrator 12. The specific entry angle of the light contacting entry aperture 16 is not critical as entry aperture 16 allows for many different entry angles. Once light enters compound parabolic light concentrator 12, it is reflected throughout concentrator 12 according to principles of total internal reflection. Total internal reflection is a phenomenon which occurs when a propagating wave strikes a medium boundary at an angle larger than a particular critical angle with respect to the normal to the surface. If a material outside of assembly 10 has a refractive index that is lower than that of assembly 10, the light wave will not be reflected through that material. As a result, the light is entirely reflected, in this case through assembly 10 and not through the outside material. Typically, due to the presence of air is outside of concentrator 12, light does not leak from concentrator 12. This is because air has a different refractive index (1) than concentrator 12 (about 1.3 to about 1.8). Therefore, light is kept within concentrator 12.

Optical adhesive layer 24 has a substantially equivalent refractive index to compound parabolic light concentrator 12. Light is therefore reflected through optical adhesive layer to photodiode sensor 22. Photodiode sensor 22 is a semiconductor that converts light into current. The current generated from photodiode sensor 22 may be used to create an image on a display.

The performance of photodiode sensor 22, or any system that assembly 10 is used in conjunction with assembly 10, depends on many different factors. For example, three factors are the adhesion provided by optical adhesion layer 24, the uniformity of the bond layer thickness of optical adhesion layer 24 having very low to zero voids, and the ability of protrusion to contain optical adhesion layer 24 within cavity 26.

Poor adhesion between compound parabolic light concentrator 12 and photodiode sensor 22 can lead to small voids between optical adhesion layer 24 and either concentrator 12 or photodiode sensor 22, depending on which component layer 24 peels from. The introduction of a void can distort optical signal integrity or cause poor adhesion at the interface. Thus, the overall performance of assembly 10 is reduced in that the total reflection between concentrator 12 and optical adhesion layer 24 will be interrupted and less light will be able to contact photodiode sensor 22.

Similarly, a lack in uniformity of optical adhesion layer 24 can decrease the amount of light that is able to contact photodiode sensor 22. For example, if a bond line thickness $t_i$ of optical adhesive layer 24 is not consistent, then there can be voids between layer 24 and either concentrator 12 or photodiode sensor 22, as described above. These voids can result from the construction of assembly 10. Specifically, it has been found that dispensing a set volume of optical adhesive in order to form optical adhesive layer 24 having a predetermined bond line thickness can have an error range of +/−5 μm. This is due to the difficulty in controlling the adhesive during curing. Typically, during curing, bond line thickness is controlled by varying the pressure and timing of the release of adhesives. However, because optical adhesive layer 24 must remain clear, it is difficult to control pressure and dispensation while ensuring that no foreign particles are present in optical adhesive layer 24—the more time it takes to apply optical adhesive the more likely it is that a foreign particle will enter the adhesive. The error rate can result in great variation of bond line thickness. For example in order for optical adhesive layer 24 to have a bond line thickness of 10 μm, 1-3 nL of optical adhesive should be applied to assembly 10. However, in light of the error rate, dispensing 1 nL of adhesive can result in a bond line thickness of 10 μm or 5 μm. If the resulting thickness is 5 μm, then cavity 26 will not be filled thus leaving a void between exit aperture 16 and photodiode sensor 22, which light cannot be reflected through.

If the volume of optical adhesive applied to assembly 10 would lead to a bond line thickness that is larger than targeted, excess optical adhesive is pressed outside of the interface between exit aperture 16 and photodiode sensor 22. This tends to lead to excess optical adhesive rolling up on sidewall 18 of compound parabolic light concentrator 12 to form a fillet. Because the optical adhesive has substantially the same refractive index as concentrator 12, light entering aperture 16 is able to be reflected through the excess optical adhesive outside of sidewall 18. This leads to a reduction in the amount of light that is passed to photodiode sensor 22 and ultimately decreases the efficiency of assembly 10.

Protrusion 20, however, may help to ensure that the bond line thickness of optical adhesive layer 24 is precisely controlled. For example, protrusion 20 can help to form a preselected bond line thickness. The thickness can be any suitable thickness. For example the thickness can range from about 0.5 μm to about 100 μm, or less than about, equal to, or greater than about, 1 μm, 5, 10, 15, 20, 25, 30, 35, 40, 45, 50, 55, 60, 65, 70, 75, 80, 85, 90, and 95 μm. The preselected bond line thickness can be produced by applying a film of an optical adhesive resin having a thickness substantially equal to the preselected thickness to exit aperture 16 or photodiode sensor 22 and subsequently curing the resin. Additionally, a volume of an optical adhesive resin can be applied to exit aperture 16 or photodiode sensor 22, the resin is subsequently cured. The volume of resin that is applied can be any suitable amount. For example, the volume of resin can range from about 1 nL to about 5 nL, or less than about, equal to, or greater than about, 1.5 nL, 2.0, 2.5, 3.0, 3.5, 4.0, and 4.5 nL.

Protrusion 20 can help to control the bond line thickness of optical adhesive layer 24 by forming a mechanical boundary or dam-like structure that will substantially prevent any excess optical adhesive from leaving cavity 26. Therefore, excess optical adhesive will not be present to roll up on sidewall 18. Additionally, the error rate of the final bond line thickness is substantially reduced, compared to an assembly without protrusion 20, because the freedom of optical adhesive to move before curing is reduced. That is, after the volume of optical adhesive is applied to assembly, protrusion keeps the adhesive in place. Thus, the optical adhesive remains stationary during curing and the error rate is substantially reduced as the optical adhesive is cured thus forming layer 24 at a predetermined thickness. Protrusion 20 can come in many different forms and is discussed in more detail below.

A maximum height h1 of the protrusion measured between compound parabolic concentrator 12 exit aperture 16 and photodiode sensor 22 is substantially equivalent to the bond line thickness of optical adhesive layer 24. In some embodiments the height of protrusion 20 may be variable relative to the bond line thickness of optical adhesive layer 24. That is the height of protrusion 20 at some locations between exit aperture 16 and photodiode sensor 22 can range from about 100 percent equivalent to the bond line thickness of optical adhesive layer 24 to about 2 percent equivalent to the bond line thickness or less than about, equal to about, or greater than about, 5 percent equivalent to the bond line thickness, 10, 15, 20, 25, 30, 35, 40, 45, 50, 55, 60, 65, 70, 75, 80, 85, 90, and 95 percent equivalent to the bond line thickness. At locations where the height of protrusion is 100 percent equivalent to the bond line thickness, optical adhesive layer 24 is contained within cavity 26. At locations where the height of protrusion 20 less than 100 percent equivalent to the bond line thickness, optical adhesive layer 24 is still substantially contained within cavity 26, but the cavity between protrusion 20 and photodiode sensor 22 may allow a rout for an air bubble to escape during curing.

The profile of protrusion 20 may be continuous as illustrated in FIG. 2. As shown, a circumference of the protrusion is commensurate with the circumference of exit aperture 16 of compound parabolic concentrator. In alternative embodiments, the profile of the protrusion may be discontinuous. In this case protrusion 20 has an arc running along the perimeter of exit aperture 16 that is less than 100 percent commensurate with the perimeter of exit aperture 16. For example, the arc of protrusion can range from about 20 percent commensurate with the perimeter of exit aperture 16 to about 99 percent commensurate with the perimeter of exit aperture 16, or less than about, equal to about, or greater than about, 5 percent commensurate with the perimeter of exit aperture 16; 10, 15, 20, 25, 30, 35, 40, 45, 50, 55, 60, 65, 70, 75, 80, 85, 90, and 95 percent commensurate with the perimeter of exit aperture 16.

Figure 3:
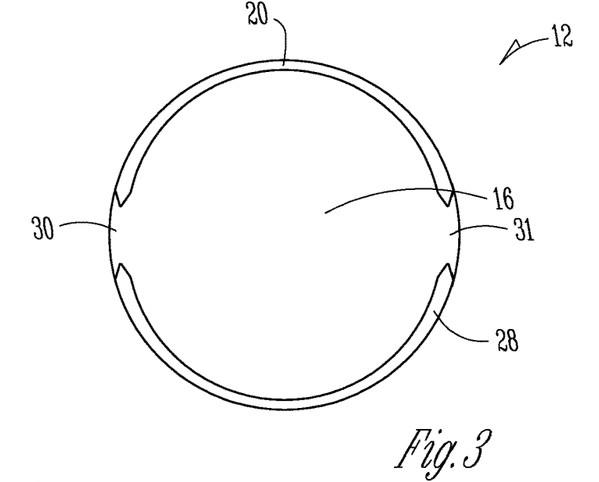
FIG. 3 is a bottom view of a compound parabolic concentrator 12, in accordance with various embodiments.

As shown in FIG. 3, which is a bottom view of compound parabolic concentrator 12, in some embodiments, assembly 10 includes second protrusion 28. Second protrusion 28 extends from a second portion of the perimeter of exit aperture 16 towards photodiode sensor 22. Second protrusion 28 has an arc running along the perimeter of exit aperture 16 that is less than 100 percent commensurate with the perimeter of exit aperture 16. For example, the arc of second protrusion 28 can range from about 20 percent commensurate with the perimeter of exit aperture 16 to about 99 percent commensurate with the perimeter of exit aperture 16, or less than about, equal to about, or greater than about, 5 percent commensurate with the perimeter of exit aperture 16; 10, 15, 20, 25, 30, 35, 40, 45, 50, 55, 60, 65, 70, 75, 80, 85, 90, and 95 percent commensurate with the perimeter of exit aperture 16.

First cavity 30 and second cavity 31 are defined between protrusion 20 and second protrusion 28. Typically, cavities 30 and 31 are sized to be small enough to allow optical adhesive layer 24 to be contained within cavity 26. However, cavities 30 and 31 are sized large enough to allow an air bubble to escape from optical adhesive layer 24. Typically, the height of protrusion 20 is substantially equivalent to the height of second protrusion 20. This can help to ensure that compound parabolic concentrator 12 is level with respect to photodiode sensor 22.

Figure 4:
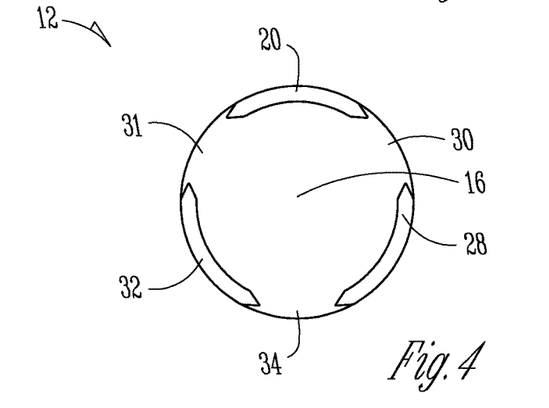
FIG. 4 is a bottom view of another compound parabolic concentrator 12, in accordance with various embodiments.

As shown in FIG. 4, which is a bottom view of compound parabolic concentrator 12 assembly 10 can further include third protrusion 32 extending between a third portion of the perimeter of the compound parabolic concentrator exit aperture and the photodiode. Third protrusion 32 extends from a third portion of the perimeter of exit aperture 16 towards photodiode sensor 22. Third protrusion 32 has an arc running along the perimeter of exit aperture 16 that is less than 100 percent commensurate with the perimeter of exit aperture 16. For example the arc of third protrusion 32 can range from about 20 percent commensurate with the perimeter of exit aperture 16 to about 99 percent commensurate with the perimeter of exit aperture 16, or less than about, equal to about, or greater than about, 5 percent commensurate with the perimeter of exit aperture 16; 10, 15, 20, 25, 30, 35, 40, 45, 50, 55, 60, 65, 70, 75, 80, 85, 90, and 95 percent commensurate with the perimeter of exit aperture 16.

Third cavity 34 is defined between second protrusion 28 and third protrusion 32. Typically, third cavity 34 is sized to be small enough to allow optical adhesive layer 24 to be contained within cavity 26. However, third cavity 34 is sized large enough to allow an air bubble to escape from optical adhesive layer 24. Typically, the height of protrusion 20, second protrusion 28, and third protrusion 32 are substantially equivalent to the height of third protrusion 32. This can help to ensure that compound parabolic concentrator 12 is level with respect to photodiode sensor 22.

Figure 5:
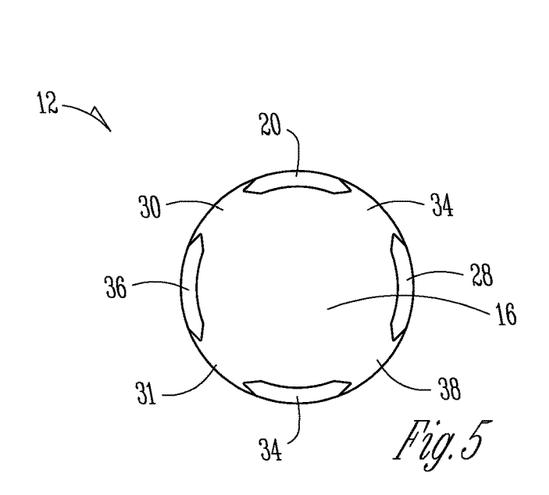
FIG. 5 is a bottom view of yet another compound parabolic concentrator 12, in accordance with various embodiments.

As shown in FIG. 5, which is a bottom view of compound parabolic concentrator 12 assembly 10 can further include fourth protrusion 36, which extends between a fourth portion of the perimeter of exit aperture 16 and the photodiode sensor 22. Fourth protrusion 36 has an arc running along the perimeter of exit aperture 16 that is less than 100 percent commensurate with the perimeter of exit aperture 16. For example the arc of fourth protrusion 36 can range from about 20 percent commensurate with the perimeter of exit aperture 16 to about 99 percent commensurate with the perimeter of exit aperture 16, or less than about, equal to about, or greater than about, 5 percent commensurate with the perimeter of exit aperture 16; 10, 15, 20, 25, 30, 35, 40, 45, 50, 55, 60, 65, 70, 75, 80, 85, 90, and 95 percent commensurate with the perimeter of exit aperture 16.

Fourth cavity 38 is defined between third protrusion 32 and fourth protrusion 36. Typically, fourth cavity 38 is sized to be small enough to allow optical adhesive layer 24 to be contained within cavity 26. However, fourth cavity 38 is sized to be large enough to allow an air bubble to escape from optical adhesive layer 24. Typically, the height of protrusion 20, second protrusion 28, third protrusion 32 are substantially equivalent to the height of fourth protrusion 36. This can help to ensure that compound parabolic concentrator 12 is level with respect to photodiode sensor 22.

According to various embodiments a method of forming assembly 10 includes aligning compound parabolic concentrator 12 a photodiode sensor. Specially, exit aperture 16 is aligned with photodiode sensor 22. An optical adhesive with a matching index of refraction is than applied to either exit aperture 16 or photodiode sensor 22. The optical adhesive can either be a liquefied resin or a film. The volume of resin that is applied can be any suitable amount. For example, the volume of resin can range from about 1 nL to about 5 nL, or less than about, equal to, or greater than about, 1.5 nL, 2.0, 2.5, 3.0, 3.5, 4.0, and 4.5 nL.

Figure 6:
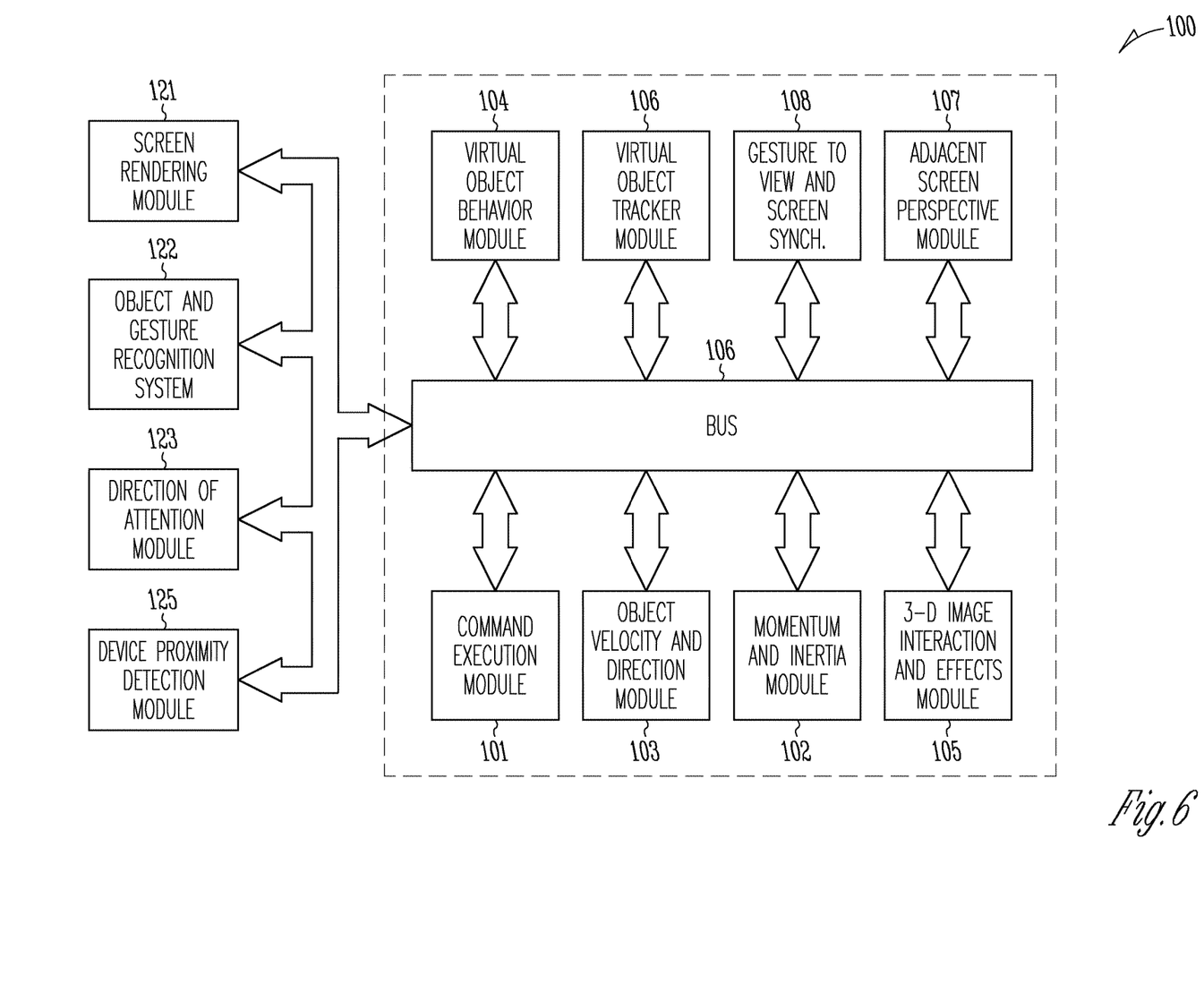
FIG. 6 is a block diagram of a computing environment capable of supporting incorporating assembly.
Figure 7:
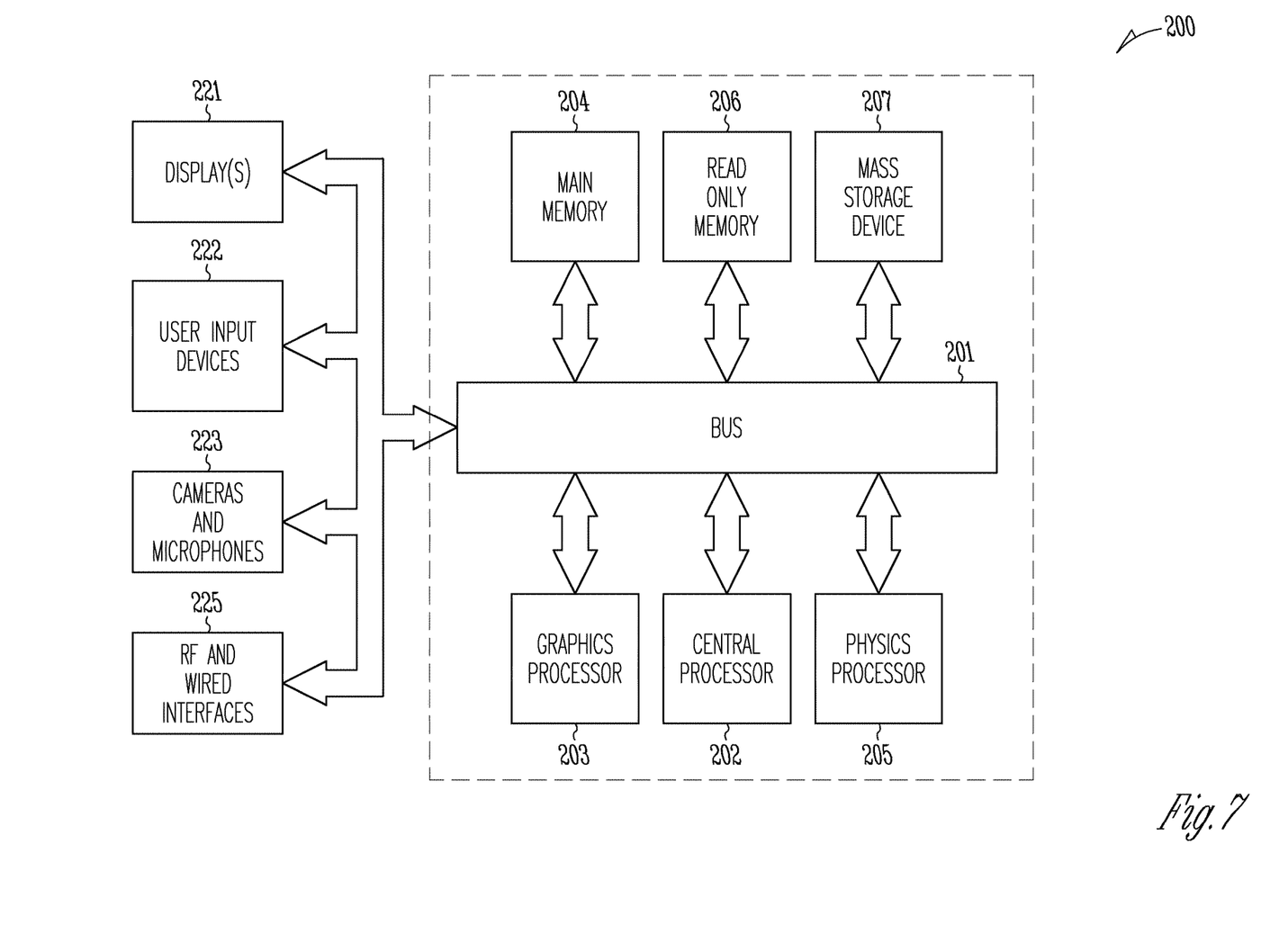
FIG. 7 is a block diagram of a computing system, such as a personal computer, gaming console, smartphone or portable gaming device.

Once the optical adhesive is applied, compound parabolic concentrator 12 and photodiode sensor 22 are contacted with each other. The optical adhesive is then cured to form optical adhesive layer 24. The bond-line thickness of optical adhesive layer 24 can be any suitable thickness. For example the thickness can range from about 0.5 μm to about 100 μm, or less than about, equal to, or greater than about, 1 μm, 5, 10, 15, 20, 25, 30, 35, 40, 45, 50, 55, 60, 65, 70, 75, 80, 85, 90, and 95 μm. The preselected bond line thickness can be produced by applying a film of an optical adhesive resin having a thickness substantially equal to the preselected thickness to exit aperture 16 or photodiode sensor 22 and subsequently curing the resin. Additionally, a volume of an optical adhesive resin can be applied to exit aperture 16 or photodiode sensor 22, the resin is subsequently cured. The volume of resin that is applied Assembly 10 can be incorporated into a camera that can be used in conjunction with a system that generates graphics on a computer device. The ability of assembly 10 to efficiently transfer light from collector 12 to photodiode sensor 22, makes assembly suitable for many applications including systems that render a 3-D view of object or are sensitive enough to capture gestures from a user. FIGS. 6 and 7 illustrate non-limiting examples of systems that include a camera in which assembly 10 can be incorporated.

FIG. 6 is a block diagram of a computing environment capable of supporting incorporating assembly 10 as discussed above. The modules and systems can be implemented in a variety of different hardware architectures and form factors including that shown in FIG. 7.

The Command Execution Module 101 includes a central processing unit to cache and execute commands and to distribute tasks among the other modules and systems shown. It may include an instruction stack, a cache memory to store intermediate and final results, and mass memory to store applications and operating systems. The Command Execution Module may also serve as a central coordination and task allocation unit for the system.

The Screen Rendering Module 121 draws objects on the one or more multiple screens for the user to see. It can be adapted to receive the data from the Virtual Object Behavior Module 104, described below, and to render the virtual object and any other objects and forces on the appropriate screen or screens. Thus, the data from the Virtual Object Behavior Module would determine the position and dynamics of the virtual object and associated gestures, forces and objects, for example, and the Screen Rendering Module would depict the virtual object and associated objects and environment on a screen, accordingly. The Screen Rendering Module could further be adapted to receive data from the Adjacent Screen Perspective Module 107, described below, to either depict a target landing area for the virtual object if the virtual object could be moved to the display of the device with which the Adjacent Screen Perspective Module is associated. Thus, for example, if the virtual object is being moved from a main screen to an auxiliary screen, the Adjacent Screen Perspective Module could send data to the Screen Rendering Module to suggest, for example in shadow form, one or more target landing areas for the virtual object on that track to a user's hand movements or eye movements.

The Object and Gesture Recognition System 122 may be adapted to recognize and track hand and harm gestures of a user. Such a module may be used to recognize hands, fingers, finger gestures, hand movements and a location of hands relative to displays. For example, the Object and Gesture Recognition Module could for example determine that a user made a body part gesture to drop or throw a virtual object onto one or the other of the multiple screens, or that the user made a body part gesture to move the virtual object to a bezel of one or the other of the multiple screens. The Object and Gesture Recognition System may be coupled to a camera or camera array, a microphone or microphone array, a touch screen or touch surface, or a pointing device, or some combination of these items, to detect gestures and commands from the user.

The touch screen or touch surface of the Object and Gesture Recognition System may include a touch screen sensor. Data from the sensor may be fed to hardware, software, firmware or a combination of the same to map the touch gesture of a user's hand on the screen or surface to a corresponding dynamic behavior of a virtual object. The sensor date may be used to momentum and inertia factors to allow a variety of momentum behavior for a virtual object based on input from the user's hand, such as a swipe rate of a user's finger relative to the screen. Pinching gestures may be interpreted as a command to lift a virtual object from the display screen, or to begin generating a virtual binding associated with the virtual object or to zoom in or out on a display. Similar commands may be generated by the Object and Gesture Recognition System using one or more cameras without benefit of a touch surface.

The Direction of Attention Module 123 may be equipped with cameras or other sensors to track the position or orientation of a user's face or hands. When a gesture or voice command is issued, the system can determine the appropriate screen for the gesture. In one example, a camera is mounted near each display to detect whether the user is facing that display. If so, then the direction of attention module information is provided to the Object and Gesture Recognition Module 122 to ensure that the gestures or commands are associated with the appropriate library for the active display. Similarly, if the user is looking away from all of the screens, then commands can be ignored.

The Device Proximity Detection Module 125 can use proximity sensors, compasses, GPS (global positioning system) receivers, personal area network radios, and other types of sensors, together with triangulation and other techniques to determine the proximity of other devices. Once a nearby device is detected, it can be registered to the system and its type can be determined as an input device or a display device or both. For an input device, received data may then be applied to the Object Gesture and Recognition System 122. For a display device, it may be considered by the Adjacent Screen Perspective Module 107.

The Virtual Object Behavior Module 104 is adapted to receive input from the Object Velocity and Direction Module, and to apply such input to a virtual object being shown in the display. Thus, for example, the Object and Gesture Recognition System would interpret a user gesture and by mapping the captured movements of a user's hand to recognized movements, the Virtual Object Tracker Module would associate the virtual object's position and movements to the movements as recognized by Object and Gesture Recognition System, the Object and Velocity and Direction Module would capture the dynamics of the virtual object's movements, and the Virtual Object Behavior Module would receive the input from the Object and Velocity and Direction Module to generate data that would direct the movements of the virtual object to correspond to the input from the Object and Velocity and Direction Module.

The Virtual Object Tracker Module 106 on the other hand may be adapted to track where a virtual object should be located in three dimensional space in a vicinity of a display, and which body part of the user is holding the virtual object, based on input from the Object and Gesture Recognition Module. The Virtual Object Tracker Module 106 may for example track a virtual object as it moves across and between screens and track which body part of the user is holding that virtual object. Tracking the body part that is holding the virtual object allows a continuous awareness of the body part's air movements, and thus an eventual awareness as to whether the virtual object has been released onto one or more screens.

The Gesture to View and Screen Synchronization Module 108, receives the selection of the view and screen or both from the Direction of Attention Module 123 and, in some cases, voice commands to determine which view is the active view and which screen is the active screen. It then causes the relevant gesture library to be loaded for the Object and Gesture Recognition System 122. Various views of an application on one or more screens can be associated with alternative gesture libraries or a set of gesture templates for a given view. As an example in FIG. 1A a pinch-release gesture launches a torpedo, but in FIG. 1B, the same gesture launches a depth charge.

The Adjacent Screen Perspective Module 107, which may include or be coupled to the Device Proximity Detection Module 125, may be adapted to determine an angle and position of one display relative to another display. A projected display includes, for example, an image projected onto a wall or screen. The ability to detect a proximity of a nearby screen and a corresponding angle or orientation of a display projected therefrom may for example be accomplished with either an infrared emitter and receiver, or electromagnetic or photodetection sensing capability. For technologies that allow projected displays with touch input, the incoming video can be analyzed to determine the position of a projected display and to correct for the distortion caused by displaying at an angle. An accelerometer, magnetometer, compass, or camera can be used to determine the angle at which a device is being held while infrared emitters and cameras could allow the orientation of the screen device to be determined in relation to the sensors on an adjacent device. The Adjacent Screen Perspective Module 107 may, in this way, determine coordinates of an adjacent screen relative to its own screen coordinates. Thus, the Adjacent Screen Perspective Module may determine which devices are in proximity to each other, and further potential targets for moving one or more virtual object's across screens. The Adjacent Screen Perspective Module may further allow the position of the screens to be correlated to a model of three-dimensional space representing all of the existing objects and virtual objects.

The Object and Velocity and Direction Module 103 may be adapted to estimate the dynamics of a virtual object being moved, such as its trajectory, velocity (whether linear or angular), momentum (whether linear or angular), etc. by receiving input from the Virtual Object Tracker Module. The Object and Velocity and Direction Module may further be adapted to estimate dynamics of a any physics forces, by for example estimating the acceleration, deflection, degree of stretching of a virtual binding, etc. and the dynamic behavior of a virtual object once released by a user's body part. The Object and Velocity and Direction Module may also use image motion, size and angle changes to estimate the velocity of objects, such as the velocity of hands and fingers The Momentum and Inertia Module 102 can use image motion, image size, and angle changes of objects in the image plane or in a three-dimensional space to estimate the velocity and direction of objects in the space or on a display. The Momentum and Inertia Module is coupled to the Object and Gesture Recognition System 122 to estimate the velocity of gestures performed by hands, fingers, and other body parts and then to apply those estimates to determine momentum and velocities to virtual objects that are to be affected by the gesture.

The 3-D Image Interaction and Effects Module 105 tracks user interaction with 3-D images that appear to extend out of one or more screens. The influence of objects in the z-axis (towards and away from the plane of the screen) can be calculated together with the relative influence of these objects upon each other. For example, an object thrown by a user gesture can be influenced by 3-D objects in the foreground before the virtual object arrives at the plane of the screen. These objects may change the direction or velocity of the projectile or destroy it entirely. The object can be rendered by the 3-D Image Interaction and Effects Module in the foreground on one or more of the displays.

FIG. 7 is a block diagram of a computing system, such as a personal computer, gaming console, smartphone or portable gaming device. The computer system 200 includes a bus or other communication means 201 for communicating information, and a processing means such as a microprocessor 202 coupled with the bus 201 for processing information. The computer system may be augmented with a graphics processor 203 specifically for rendering graphics through parallel pipelines and a physics processor 205 for calculating physics interactions as described above. These processors may be incorporated into the central processor 202 or provided as one or more separate processors.

The computer system 200 further includes a main memory 204, such as a random access memory (RAM) or other dynamic data storage device, coupled to the bus 201 for storing information and instructions to be executed by the processor 202. The main memory also may be used for storing temporary variables or other intermediate information during execution of instructions by the processor. The computer system may also include a nonvolatile memory 206, such as a read only memory (ROM) or other static data storage device coupled to the bus for storing static information and instructions for the processor.

A mass memory 207 such as a magnetic disk, optical disc, or solid state array and its corresponding drive may also be coupled to the bus of the computer system for storing information and instructions. The computer system can also be coupled via the bus to a display device or monitor 221, such as a Liquid Crystal Display (LCD) or Organic Light Emitting Diode (OLED) array, for displaying information to a user. For example, graphical and textual indications of installation status, operations status and other information may be presented to the user on the display device, in addition to the various views and user interactions discussed above.

Typically, user input devices, such as a keyboard with alphanumeric, function and other keys, may be coupled to the bus for communicating information and command selections to the processor. Additional user input devices may include a cursor control input device such as a mouse, a trackball, a trackpad, or cursor direction keys can be coupled to the bus for communicating direction information and command selections to the processor and to control cursor movement on the display 221.

Camera and microphone arrays 223 are coupled to the bus to observe gestures, record audio and video and to receive visual and audio commands as mentioned above.

Communications interfaces 225 are also coupled to the bus 201. The communication interfaces may include a modem, a network interface card, or other well-known interface devices, such as those used for coupling to Ethernet, token ring, or other types of physical wired or wireless attachments for purposes of providing a communication link to support a local or wide area network (LAN or WAN), for example. In this manner, the computer system may also be coupled to a number of peripheral devices, other clients, or control surfaces or consoles, or servers via a conventional network infrastructure, including an Intranet or the Internet, for example.

It is to be appreciated that a lesser or more equipped system than the example described above may be preferred for certain implementations. Therefore, the configuration of the exemplary systems 100 and 200 will vary from implementation to implementation depending upon numerous factors, such as price constraints, performance requirements, technological improvements, or other circumstances.

Additional Embodiments

The following exemplary embodiments are provided, the numbering of which is not to be construed as designating levels of importance:

Embodiment 1 provides an assembly comprising:
an optical concentrator comprising;
an exit aperture having a generally circular perimeter defining a circumference of the exit aperture;
a photodiode sensor generally aligned with the exit aperture of the compound parabolic concentrator;
an adhesive layer adhering the exit aperture of the optical concentrator to the photodiode sensor; and
a protrusion extending between at least a portion of the perimeter of the optical concentrator exit aperture and the photodiode.

Embodiment 2 provides the assembly of Embodiment 1, wherein a refractive index of each of the compound parabolic concentrator, the protrusion, the adhesive layer, and the photodiode sensor are substantially equivalent.

Embodiment 3 provides the assembly of any one of Embodiments 1-2, wherein the refractive index ranges from about 1.3 to about 1.8.

Embodiment 4 provides the assembly of any one of Embodiments 1-3, wherein the exit aperture perimeter, the photodiode sensor, and the protrusion substantially define a cavity that the adhesive layer is located within.

Embodiment 5 provides the assembly of any one of Embodiments 1-4, wherein the assembly is substantially free of optical adhesive located outside of the cavity.

Embodiment 6 provides the assembly of any one of Embodiments 1-5, wherein the protrusion is integral to the optical concentrator exit aperture.

Embodiment 7 provides the assembly of any one of Embodiments 1-6, wherein the adhesive layer comprises an epoxy resin.

Embodiment 8 provides the assembly of any one of Embodiments 1-7, wherein the protrusion substantially encases adhesive layer.

Embodiment 9 provides the assembly of any one of Embodiments 1-8, wherein a bond line thickness of the adhesive layer ranges from about 1 µm to about 25 µm.

Embodiment 10 provides the assembly of any one of Embodiments 1-9, wherein a bond line thickness of the adhesive layer ranges from about 5 µm to about 20 µm.

Embodiment 11 provides the assembly of any one of Embodiments 1-10, wherein a bond line thickness of the adhesive layer ranges from about 10 µm to about 15 µm.

Embodiment 12 provides the assembly of any one of Embodiments 1-11, wherein a volume of the adhesive layer encased by the protrusion ranges from about 1 nL to about 5 nL.

Embodiment 13 provides the assembly of any one of Embodiments 1-12, wherein a volume of the adhesive layer encased by the protrusion ranges from about 1 nL to about 4 nL.

Embodiment 14 provides the assembly of any one of Embodiments 1-13, wherein a volume of the adhesive layer encased by the protrusion ranges from about 2 nL to about 5 nL.

Embodiment 15 provides the assembly of any one of Embodiments 1-14, wherein a volume of the adhesive layer encased by the protrusion ranges from about 2 nL to about 4 nL.

Embodiment 16 provides the assembly of any one of Embodiments 1-15, wherein a height of the protrusion measured between the optical concentrator exit aperture and the photodiode sensor is substantially equivalent to a bond line thickness of the adhesive layer, measured between the optical concentrator exit aperture and the photodiode sensor.

Embodiment 17 provides the assembly of any one of Embodiments 1-16, wherein a height of the protrusion measured between the optical concentrator exit aperture and the photodiode sensor is variable relative to a bond line thickness of the adhesive layer, measured between the optical concentrator exit aperture and the photodiode sensor.

Embodiment 18 provides the assembly of any one of Embodiments 1-17, wherein the height of the protrusion measured between the optical concentrator exit aperture and the photodiode sensor ranges from 100 percent equivalent to the bond line thickness of the adhesive layer to about 2 percent of the bond line thickness of the adhesive layer.

Embodiment 19 provides the assembly of any one of Embodiments 1-18, wherein the height of the protrusion measured between the optical concentrator exit aperture and the photodiode sensor ranges from 100 percent equivalent to the bond line thickness of the adhesive layer to about 20 percent of the bond line thickness of the adhesive layer.

Embodiment 20 provides the assembly of any one of Embodiments 1-19, wherein the height of the protrusion measured between the optical concentrator exit aperture and the photodiode sensor ranges from 100 percent equivalent to the bond line thickness of the adhesive layer to about 40 percent of the bond line thickness of the adhesive layer.

Embodiment 21 provides the assembly of any one of Embodiments 1-20, wherein the height of the protrusion measured between the optical concentrator exit aperture and the photodiode sensor ranges from 100 percent equivalent to the bond line thickness of the adhesive layer to about 60 percent of the bond line thickness of the adhesive layer.

Embodiment 22 provides the assembly of any one of Embodiments 1-21, wherein the height of the protrusion measured between the optical concentrator exit aperture and the photodiode sensor ranges from 100 percent equivalent to the bond line thickness of the adhesive layer to about 80 percent of the bond line thickness of the adhesive layer.

Embodiment 23 provides the assembly of any one of Embodiments 1-22, wherein the profile of the protrusion is continuous such that a circumference of the protrusion is commensurate with the circumference of the exit aperture of the compound parabolic concentrator.

Embodiment 24 provides the assembly of any one of Embodiments 1-23, wherein the profile of the protrusion is discontinuous such that an arc of the protrusion is less than 100 percent commensurate with the exit aperture perimeter of the compound parabolic concentrator.

Embodiment 25 provides the assembly of any one of Embodiments 1-24, wherein the arc of the protrusion ranges from 20 percent to 99 percent commensurate with the exit aperture perimeter of the compound parabolic concentrator.

Embodiment 26 provides the assembly of any one of Embodiments 1-25, wherein the arc of the protrusion ranges from 20 percent to 40 percent commensurate with the exit aperture perimeter of the compound parabolic concentrator.

Embodiment 27 provides the assembly of any one of Embodiments 1-26, wherein the arc of the protrusion ranges from 80 percent to 99 percent commensurate with the exit aperture perimeter of the compound parabolic concentrator.

Embodiment 28 provides the assembly of any one of Embodiments 1-27, wherein the arc of the protrusion ranges from 90 percent to 99 percent commensurate with the exit aperture perimeter of the compound parabolic concentrator.

Embodiment 29 provides the assembly of any one of Embodiments 1-28, and further comprising:
a second protrusion extending between a second portion of the perimeter of the optical concentrator exit aperture and the photodiode.

Embodiment 30 provides the assembly of any one of Embodiments 1-29, wherein the second portion comprises about 20 percent to about 90 percent of the perimeter of the optical concentrator exit aperture and the photodiode.

Embodiment 31 provides the assembly of any one of Embodiments 1-30, wherein the second portion comprises about 20 percent to about 70 percent of the perimeter of the optical concentrator exit aperture and the photodiode.

Embodiment 32 provides the assembly of any one of Embodiments 1-31, wherein the second portion comprises about 33 percent to about 66 percent of the perimeter of the optical concentrator exit aperture and the photodiode.

Embodiment 33 provides the assembly of any one of Embodiments 1-32, wherein a height of the first protrusion is substantially equivalent to a height of the second protrusion.

Embodiment 34 provides the assembly of any one of Embodiments 1-33, and further comprising:
a third protrusion extending between a third portion of the perimeter of the optical concentrator exit aperture and the photodiode.

Embodiment 35 provides the assembly of any one of Embodiments 1-34, wherein the third portion comprises about 20 percent to about 90 percent of the perimeter of the optical concentrator exit aperture and the photodiode.

Embodiment 36 provides the assembly of any one of Embodiments 1-35, wherein the third portion comprises about 20 percent to about 70 percent of the perimeter of the optical concentrator exit aperture and the photodiode.

Embodiment 37 provides the assembly of any one of Embodiments 1-36, wherein the third portion comprises about 33 percent to about 66 percent of the perimeter of the optical concentrator exit aperture and the photodiode.

Embodiment 38 provides the assembly of any one of Embodiments 1-37, wherein a height of the third protrusion is substantially equivalent to the height of the first protrusion and the height of the second protrusion.

Embodiment 39 provides the assembly of any one of Embodiments 1-38, and further comprising:
a fourth protrusion extending between a fourth portion of the perimeter of the optical concentrator exit aperture and the photodiode.

Embodiment 40 provides the assembly of any one of Embodiments 1-39, wherein the fourth portion comprises about 20 percent to about 90 percent of the perimeter of the optical concentrator exit aperture and the photodiode.

Embodiment 41 provides the assembly of any one of Embodiments 1-40, wherein the fourth portion comprises about 20 percent to about 70 percent of the perimeter of the optical concentrator exit aperture and the photodiode.

Embodiment 42 provides the assembly of any one of Embodiments 1-41, wherein the fourth portion comprises about 33 percent to about 66 percent of the perimeter of the optical concentrator exit aperture and the photodiode.

Embodiment 43 provides the assembly of any one of Embodiments 1-42, wherein a height of the fourth portion is substantially equivalent to the height of the first portion, the height of the second portion, and the height of the third portion.

Embodiment 44 provides a compound parabolic concentrator comprising:
a generally circular light entrance aperture having a first circumference;
a generally circular light exit aperture having a second circumference smaller than the first circumference and defining a perimeter of the exit aperture;
a protrusion extending axially from at least a portion of a perimeter of the light exit aperture; and
a side wall connecting the light entrance aperture to the light exit aperture;

Embodiment 45 provides the compound parabolic concentrator of Embodiment 44, wherein the concentrator is formed from a material having a light refractive index ranging from about 1.3 to about 1.8.

Embodiment 46 provides the compound parabolic concentrator of any one of Embodiments 44-45, wherein the protrusion comprises a generally circular profile commensurate with the perimeter of the of the compound parabolic concentrator light exit aperture.

Embodiment 47 provides the compound parabolic concentrator of any one of Embodiments 44-46, wherein the profile of the protrusion is continuous such that a circumference of the protrusion is commensurate with the circumference of the light exit aperture of the compound parabolic concentrator.

Embodiment 48 provides the compound parabolic concentrator of any one of Embodiments 44-47, wherein the profile of the protrusion is discontinuous such that an arc of the protrusion is less than 100 percent commensurate with the light exit aperture of the compound parabolic concentrator.

Embodiment 49 provides the compound parabolic concentrator of any one of Embodiments 44-48, wherein the arc of the protrusion ranges from 20 percent to 99 percent commensurate with the light exit aperture of the compound parabolic concentrator.

Embodiment 50 provides the compound parabolic concentrator of any one of Embodiments 44-49, wherein the arc of the protrusion ranges from 20 percent to 40 percent commensurate with the light exit aperture of the compound parabolic concentrator.

Embodiment 51 provides the compound parabolic concentrator of any one of Embodiments 44-50, wherein the arc of the protrusion ranges from 80 percent to 99 percent commensurate with the light exit aperture of the compound parabolic concentrator.

Embodiment 52 provides the compound parabolic concentrator of any one of Embodiments 44-51, wherein the arc of the protrusion ranges from 90 percent to 99 percent commensurate with the light exit aperture of the compound parabolic concentrator.

Embodiment 53 provides the assembly of any one of Embodiments 44-52, and further comprising:

a second protrusion extending between a second portion of the perimeter of the compound parabolic concentrator exit aperture and the photodiode.

Embodiment 54 provides the assembly of any one of Embodiments 44-53, wherein the second portion comprises about 20 percent to about 90 percent of the perimeter of the compound parabolic concentrator light exit aperture and the photodiode.

Embodiment 55 provides the assembly of any one of Embodiments 44-54, wherein the second portion comprises about 20 percent to about 70 percent of the perimeter of the compound parabolic concentrator light exit aperture and the photodiode.

Embodiment 56 provides the assembly of any one of Embodiments 44-55, wherein the second portion comprises about 33 percent to about 66 percent of the perimeter of the compound parabolic concentrator light exit aperture and the photodiode.

Embodiment 57 provides the compound parabolic concentrator of any one of Embodiments 44-56, wherein a height of the first protrusion is substantially equivalent to a height of the second protrusion.

Embodiment 58 provides the compound parabolic concentrator of any one of Embodiments 44-57, and further comprising:

a third protrusion extending between a third portion of the perimeter of the compound parabolic concentrator light exit aperture and the photodiode.

Embodiment 59 provides the compound parabolic concentrator of any one of Embodiments 44-58, wherein the third portion comprises about 20 percent to about 90 percent of the perimeter of the compound parabolic concentrator light exit aperture and the photodiode.

Embodiment 60 provides the compound parabolic concentrator of any one of Embodiments 44-59, wherein the third portion comprises about 20 percent to about 70 percent of the perimeter of the compound parabolic concentrator light exit aperture and the photodiode.

Embodiment 61 provides the compound parabolic concentrator of any one of Embodiments 44-60, wherein the third portion comprises about 33 percent to about 66 percent of the perimeter of the compound parabolic concentrator light exit aperture and the photodiode.

Embodiment 62 provides the compound parabolic concentrator of any one of Embodiments 44-61, wherein a height of the third protrusion is substantially equivalent to the height of the first protrusion and the height of the second protrusion.

Embodiment 63 provides the compound parabolic concentrator of any one of Embodiments 44-62, and further comprising:

a fourth protrusion extending between a fourth portion of the perimeter of the compound parabolic concentrator exit aperture and the photodiode.

Embodiment 64 provides the compound parabolic concentrator of any one of Embodiments 44-63, wherein the fourth portion comprises about 20 percent to about 90 percent of the perimeter of the compound parabolic concentrator light exit aperture and the photodiode.

Embodiment 65 provides the compound parabolic concentrator of any one of Embodiments 44-64, wherein the fourth portion comprises about 20 percent to about 70 percent of the perimeter of the compound parabolic concentrator light exit aperture and the photodiode.

Embodiment 66 provides the compound parabolic concentrator of any one of Embodiments 44-65, wherein the fourth portion comprises about 33 percent to about 66 percent of the perimeter of the compound parabolic concentrator light exit aperture and the photodiode.

Embodiment 67 provides the compound parabolic concentrator of any one of Embodiments 44-66, wherein a height of the fourth portion is substantially equivalent to the height of the first portion, the height of the second portion, and the height of the third portion.

Embodiment 68 provides a method of forming an assembly comprising:

aligning a compound parabolic concentrator with a photodiode sensor, wherein the compound parabolic concentrator comprises:
- a generally circular entrance aperture having a first circumference;
- a generally circular exit aperture having a second circumference smaller than the first circumference and defining a perimeter of the exit aperture;
- a protrusion extending axially from at least a portion of a perimeter of the exit aperture; and
- a side wall connecting the entrance aperture to the exit aperture;

contacting at least one of the exit aperture and the photodiode sensor with an optical adhesive; and contacting the protrusion of the compound parabolic concentrator with the photodiode sensor.

Embodiment 69 provides the method of Embodiment 68, wherein the optical adhesive is a film.

Embodiment 70 provides the method of any one of Embodiments 68-69, wherein a volume of the optical adhesive ranges from about from about 1 nL to about 5 nL.

Embodiment 71 provides the method of any one of Embodiments 68-70, wherein a volume of the optical adhesive ranges from about from about 1 nL to about 4 nL.

Embodiment 72 provides the method of any one of Embodiments 68-71, wherein a volume of the optical adhesive ranges from about from about 2 nL to about 5 nL.

Embodiment 73 provides the method of any one of Embodiments 68-72, wherein a volume of the optical adhesive ranges from about from about 2 nL to about 4 nL.

Embodiment 74 provides the method of any one of Embodiments 68-73, wherein the exit aperture perimeter, photodiode sensor, and protrusion substantially define a cavity that the optical adhesive is located within.

Embodiment 75 provides the method of claim 68-74, wherein the volume of optical adhesive is cured to form a layer of optical adhesive having a predetermined bond line thickness.

Embodiment 76 provides the method of any one of Embodiments 68-75, wherein a bond line thickness of the optical adhesive layer ranges from about 1 µm to about 25 µm.

Embodiment 77 provides the method of any one of Embodiments 68-76, wherein a bond line thickness of the optical adhesive layer ranges from about 5 µm to about 20 µm.

Embodiment 78 provides the method of any one of Embodiments 68-77, wherein a bond line thickness of the optical adhesive layer ranges from about 10 µm to about 15 µm.

Embodiment 79 provides the method of any one of Embodiments 68-78, wherein the optical adhesive adheres the compound parabolic concentrator to the photodiode sensor.

Embodiment 80 provides the method of any one of Embodiments 68-79, wherein a height of the protrusion measured between the compound parabolic concentrator exit aperture and the photodiode sensor is substantially equivalent to a bond line thickness of the optical adhesive layer, measured between the compound parabolic concentrator exit aperture and the photodiode sensor.

What is claimed is:

1. An assembly comprising:
an optical concentrator comprising;
an exit aperture having a generally circular perimeter defining a circumference of the exit aperture;
a photodiode sensor generally aligned with the exit aperture of the compound parabolic concentrator;
an adhesive layer adhering the exit aperture of the compound parabolic concentrator to the photodiode sensor; and
a protrusion extending between at least a portion of the perimeter of the concentrator exit aperture and the photodiode, wherein
a refractive index of each of the optical concentrator, the protrusion, the adhesive layer, and the photodiode sensor are substantially equivalent.

2. The assembly of claim 1, wherein the exit aperture perimeter, the photodiode sensor, and the protrusion substantially define a cavity that the adhesive layer is located within.

3. The assembly of claim 1, wherein a height of the protrusion measured between the optical concentrator exit aperture and the photodiode sensor is substantially equivalent to a bond line thickness of the adhesive layer, measured between the optical concentrator exit aperture and the photodiode sensor.

4. The assembly of claim 1, wherein a profile of the protrusion is discontinuous such that an arc of the protrusion is less than 100 percent commensurate with the exit aperture perimeter of the optical concentrator.

5. The assembly of claim 4, wherein an arc of the protrusion ranges from 20 percent to 99 percent commensurate with the exit aperture perimeter of the optical concentrator.

6. The assembly of claim 1, and further comprising:
a second protrusion extending between a second portion of the perimeter of the optical concentrator exit aperture and the photodiode.

7. The assembly of claim 6, wherein the second portion comprises about 20 percent to about 90 percent of the perimeter of the optical concentrator exit aperture and the photodiode.

8. The assembly of claim 6, and further comprising:
a third protrusion extending between a third portion of the perimeter of the optical concentrator exit aperture and the photodiode.

9. A compound parabolic concentrator comprising:
a generally circular light entrance aperture having a first circumference;
a generally circular light exit aperture having a second circumference smaller than the first circumference and defining a perimeter of the exit aperture;
a first protrusion extending axially from at least a portion of a perimeter of the light exit aperture;
a side wall connecting the light entrance aperture to the light exit aperture; and
a second protrusion extending between a second portion of the perimeter of the circular light exit aperture and a photodiode, wherein a height of the first protrusion is substantially equivalent to a height of the second protrusion.

10. The compound parabolic concentrator of claim 9, wherein the concentrator is formed from a material having a light refractive index ranging from about 1.3 to about 1.8.

11. The compound parabolic concentrator of claim 9, wherein the protrusion defines a generally circular profile commensurate with the perimeter of the of the compound parabolic concentrator light exit aperture.

12. The compound parabolic concentrator of claim 11, wherein the profile of the protrusion is continuous such that a circumference of the protrusion is commensurate with the circumference of the light exit aperture of the compound parabolic concentrator.

13. The compound parabolic concentrator of claim 11, wherein a profile of the protrusion is discontinuous such that an arc of the protrusion is less than 100 percent commensurate with the light exit aperture of the compound parabolic concentrator.

14. A method of forming an assembly comprising:
aligning a compound parabolic concentrator with a photodiode sensor, wherein the compound parabolic concentrator comprises:
a generally circular entrance aperture having a first circumference;
a generally circular exit aperture having a second circumference smaller than the first circumference and defining a perimeter of the exit aperture;
a protrusion extending axially from at least a portion of a perimeter of the exit aperture; and
a side wall connecting the entrance aperture to the exit aperture;
contacting at least one of the exit aperture and the photodiode sensor with an optical adhesive; and
contacting the protrusion of the compound parabolic concentrator with the photodiode sensor, wherein
the exit aperture perimeter, photodiode sensor, and protrusion substantially define a cavity that the optical adhesive is located within.

15. The method of claim 14, wherein the optical adhesive is a film.

16. The method of claim 14, wherein a volume of the optical adhesive ranges from about from about 1 nL, to about 5 nL.

17. The method of claim 14, wherein the exit aperture perimeter, photodiode sensor, and protrusion substantially define a cavity that the optical adhesive is located within.

18. The method of claim 14, wherein the volume of optical adhesive is cured to form a layer of optical adhesive having a predetermined bond line thickness.

\* \* \* \* \*

UNITED STATES PATENT AND TRADEMARK OFFICE
CERTIFICATE OF CORRECTION

PATENT NO. : 11,156,815 B2
APPLICATION NO. : 16/336607
DATED : October 26, 2021
INVENTOR(S) : Chiu et al.

Page 1 of 1

It is certified that error appears in the above-identified patent and that said Letters Patent is hereby corrected as shown below:

In the Claims

In Column 18, Line 30, in Claim 11, delete "of the of the" and insert --of the-- therefor In Column 18, Line 66, in Claim 16, delete "1 nL," and insert --1 nL-- therefor Signed and Sealed this
Eighth Day of March, 2022

Drew Hirshfeld
*Performing the Functions and Duties of the*
*Under Secretary of Commerce for Intellectual Property and*
*Director of the United States Patent and Trademark Office*